(No Model.)

A. ANSLEY.
POTATO DIGGER.

No. 272,845. Patented Feb. 27, 1883.

WITNESSES:
Fred. G. Dieterich.
C. H. Baker.

INVENTOR.
Alanson Ansley,
by Louis Bagger & Co.
ATTORNEYS

UNITED STATES PATENT OFFICE.

ALANSON ANSLEY, OF GENEVA, NEW YORK.

POTATO-DIGGER.

SPECIFICATION forming part of Letters Patent No. 272,845, dated February 27, 1883.

Application filed October 24, 1882. (No model.)

*To all whom it may concern:*

Be it known that I, ALANSON ANSLEY, of Geneva, in the county of Ontario and State of New York, have invented certain new and useful Improvements in Potato-Diggers; and I do hereby declare that the following is a full, clear, and exact description of the invention, which will enable others skilled in the art to which it appertains to make and use the same, reference being had to the accompanying drawings, which form a part of this specification, and in which—

Figure 1:
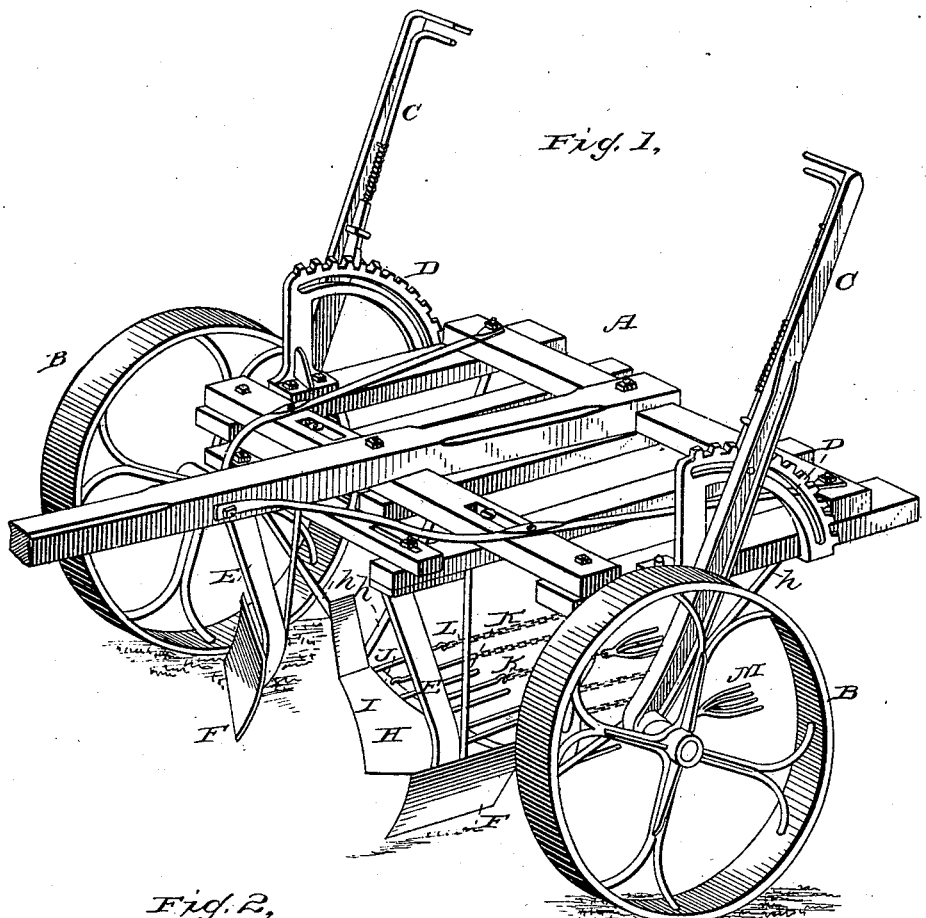
Figure 2:
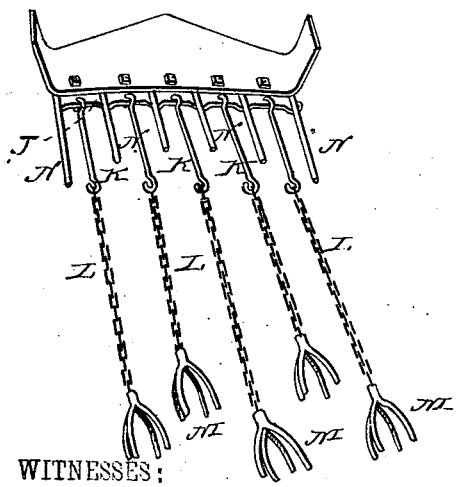
Figure 3:
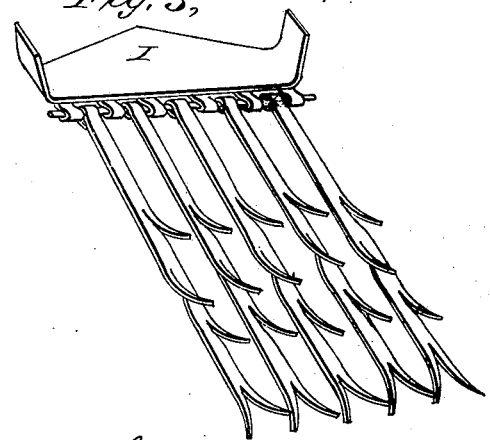

Figure 1 is a perspective view of my improved potato-digger. Fig. 2 is a detail view of the digger detached, and Fig. 3 is a similar view of a modification of the digger.

Similar letters of reference indicate corresponding parts in all the figures.

My invention has relation to devices for digging and cleaning potatoes, and is designed as an improvement upon my Patent No. 246,279, of August 30, 1881; and the novelty consists in the construction and arrangement of parts, as will be more fully hereinafter set forth, and specifically pointed out in the claims.

In the accompanying drawings, A represents the frame; B, the wheel; C, the adjustable levers; D, the two segments, and E the plow-standards. These features are fully shown and described in the patent hereinbefore referred to, and there is no occasion for further reference to them in this application.

F are the opening-plows, fastened to the plow-standards E, and have their mold-boards turned in opposite directions to throw the dirt aside from the digger H, which is supported and braced by the four divergent braces *h*. The digger H, which is shown in detail in Fig. 2, consists of a plate, I, having its two sides turned up where it is fastened to the braces, for the purpose of gathering the dirt containing the potatoes which the opening-plows have broken up, and subject it to the action of the separating devices, while it comes to a point in front to enable it to enter the ground easier. To the under side of this plate or shovel, and extending slightly beyond the rear edge of it, is fastened a strip, J, having its rear edge perforated for the attachment of iron rods K, having chains L and pronged drags M. These iron rods have eyes in both ends, and while the one eye is fastened into one of the holes in the edge of strip J the chains L are fastened to the other eye. In the outer end of these chains are fastened the pronged drags, which serve to loosen the soil and separate the potatoes from it.

Alternating with the perforations for the reception of the drag rods and chains are fastened rods N, between the plate I and strip J, where they are held in position, resting in indentures or grooves in the strip J, which is firmly bolted to the plate I and held fast by it. By fastening the drag-chains to the short rods K, the chains are prevented from becoming tangled immediately behind the digger, which easily takes place where the chains are fastened to the digger, and in which case the raised dirt will fall in the space left open by the chains being tangled, and consequently not be broken and pulverized by the action of the chains, which serve to separate the potatoes from the dirt. The chains L are of alternating lengths, which serves to stir the soil more effectually, as the soil which has been stirred by the drags on the shorter chains is thrown in the line of those upon the longer chains, and in this manner stirred twice, where chains of the same length only stir it once. The rigid rods N and hinged rods K serve to perform the primary breaking and stirring of the soil, while the looser and flexible drag-chains and their pronged drags serve to pulverize the soil thus broken, and to separate the potatoes and clean them from the adhering dirt.

In Fig. 3 of the drawings I have shown a modification of the separating-rods, which may be used alone or in connection with the rods, chains, and drags. This modification consists in hinging a series of pronged rods to the rear of the digger-shovel or the bottom strip. Each of these rods has prongs projecting laterally and upward, and is pronged at its rear end, and they serve the same purpose as the other separating rods and chains to pulverize the soil.

I am aware that potato-diggers have been constructed with drag-chains and pronged drags fastened to the digger-shovel, or with bars fastened to the same, and I do not claim either of these constructions, broadly; but What I do claim, and desire to secure by Letters Patent of the United States, is—

In a potato-digger of the described class, the combination of the digger-shovel H, having rigid fingers or bars N and perforations between the said bars, with the bars K, having eyes at each end, hooked in the perforations between bars N, and provided with chains L of alternating lengths, having pronged drags M, substantially as and for the purpose shown and set forth.

In testimony that I claim the foregoing as my own I have hereunto affixed my signature in presence of two witnesses.

ALANSON ANSLEY.

Witnesses:
SAMUEL SOUTHWORTH,
CHARLES HERBERT RUSH.